US007649457B2

(12) United States Patent
Al-Jafar

(10) Patent No.: US 7,649,457 B2
(45) Date of Patent: Jan. 19, 2010

(54) ELECTRONIC ALARM

(76) Inventor: Ahmed I. S. I. Al-Jafar, P.o Box 25263, Safat 13113 (KW)

( * ) Notice: Subject to any disclaimer, the term of this patent is extended or adjusted under 35 U.S.C. 154(b) by 331 days.

(21) Appl. No.: 11/761,602

(22) Filed: Jun. 12, 2007

(65) Prior Publication Data

US 2008/0309483 A1 Dec. 18, 2008

(51) Int. Cl.
*G08B 1/08* (2006.01)
*H04M 11/04* (2006.01)

(52) U.S. Cl. ............................ 340/539.14; 340/539.26; 379/42; 379/44

(58) Field of Classification Search .... 340/500–539.11, 340/539.14, 539.16–539.22, 539.26–539.29, 340/540, 541, 693.5, 693.6, 3.1, 3.5, 3.54, 340/3.7; 379/42, 44
See application file for complete search history.

(56) References Cited

U.S. PATENT DOCUMENTS 5,689,235 A * 11/1997 Sugimoto et al. ........... 340/541
5,892,442 A * 4/1999 Ozery ................... 340/539.14
6,032,036 A * 2/2000 Maystre et al. .......... 455/404.1
6,157,317 A * 12/2000 Walker ....................... 340/7.1
6,356,192 B1 * 3/2002 Menard et al. ......... 340/539.19
6,370,233 B1 * 4/2002 Bennett et al. ................ 379/37
2002/0080015 A1 * 6/2002 Kobayashi et al. .......... 340/426
2002/0163430 A1 * 11/2002 Bergman et al. ............ 340/531
2003/0132839 A1 * 7/2003 Jansco ........................ 340/506

* cited by examiner

*Primary Examiner*—Jennifer Mehmood
(74) *Attorney, Agent, or Firm*—Lowe Hauptman Ham & Berner, LLP

(57) ABSTRACT

The alarm system uses a presently available telephone set and an electronic circuit. The electronic circuit is connected to a plurality of sensors. The electronic circuit, in order to operate, uses DC voltage which is equal to the supply voltage of the telephone set. The sensors form the inputs for the electronic circuit of the alarm system. The inputs for the electronic circuit are connected to the pull up resistors.

1 Claim, 5 Drawing Sheets

ELECTRONIC ALARM

FIELD OF THE INVENTION

The present invention relates to a system for automatically monitoring the status and safety of an environment such as home, office etc., and more particularly to an alarm system which uses inherent capabilities of presently available commercial telephone sets for identifying the kind of emergency in an environment and reporting such emergency events to places distant from the event for quick and appropriate response.

BACKGROUND OF THE INVENTION

Devices for the promotion of safety and security of persons and property are well known. The most common of these devices is an automobile alarm. The automobile alarm is used to monitor the opening of doors and sound an alarm if the device has not been disabled. There are other security devices which are utilized during normal business hours to monitor computer tasks running on a work station and place alert calls when a job within a task has been completed or fails. In the past and into the present time there has been an increased emphasis on safety of a house or an office, particularly in the absence of people living or working therein.

A Stillwell U.S. Pat. No. 4,887,291, discloses a system for annunciating emergencies. As disclosed, a system that can monitor occupied or unoccupied buildings and annunciate to a distant point, e.g. a digital pocket pager, emergency events such as burglaries, fires, high or low temperature, high or low flow rate in such devices such as boilers and many more. The system has a circuit that makes interfacing with most commercial field detectors especially easy, and a circuit that enables the system to easily access telephone lines, so as to transmit annunciation messages.

Notwithstanding the above, it is presently believed that there may be a market for an alarm system which uses inherent capabilities of presently available commercial telephone sets for identifying the kind of emergency in an environment, such as home or office, and reporting such emergency events to places distant from the event for quick and appropriate response. It is believed that there may be a market for this alarm system because, the alarm system can be used in parallel with the presently available commercial telephone sets, such that, the telephone can be used normally during the period when no emergency events occur.

SUMMARY OF THE INVENTION

In essence, the present invention contemplates an alarm system for use with a pager system. The alarm system comprises a preprogrammed electronic circuit, a plurality of sensors, a telephone set connected in parallel to the preprogrammed electronic circuit and means for triggering each of said plurality of sensors thereby causing the electronic circuit to generate codes. The electronic circuit, in order to operate, uses DC voltage which is equal to the supply voltage of the telephone set. Each of the sensors forms an input to the electronic circuit. The sensors are configured to sense a breaking of light beam, pressure, motion, temperature and smoke.

Accordingly, it is an object of the invention to provide an alarm system which uses inherent capabilities of presently available commercial telephone sets for identifying the kind of emergency in an environment and reporting such emergency events to places distant from the event for quick and appropriate response.

It is a further object of this invention to provide an alarm system that is inexpensive and easy to manufacture. In particular, it is an object of the invention to provide such an alarm system that needs no specially manufactured parts, but rather one that is usable with an existing home or office telephone set. The alarm system according to the present invention is effective, simple in construction and insures reliability.

DETAILED DESCRIPTION OF THE PREFERRED EMBODIMENTS

Although the invention is described in terms of a specific embodiment, it will be readily apparent to those skilled in the art that various modifications, rearrangements and substitutions can be made without departing from the scope of the invention.

The invention will now be further described by way of example with reference to the accompanying drawings.

Figure 1:
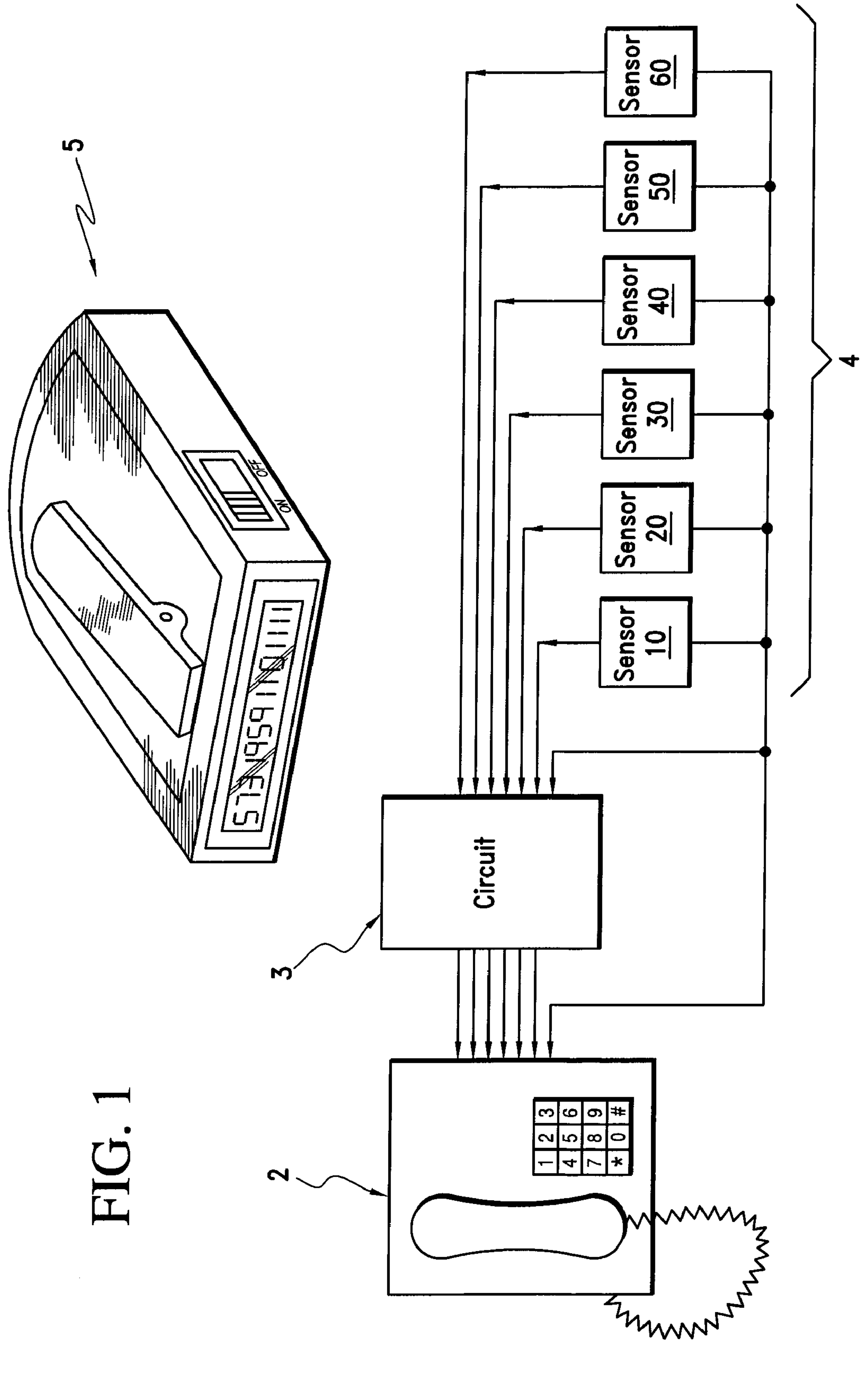
FIG. 1 is a block diagram of an alarm system with a commercial telephone set according to the present invention.
Figure 4:
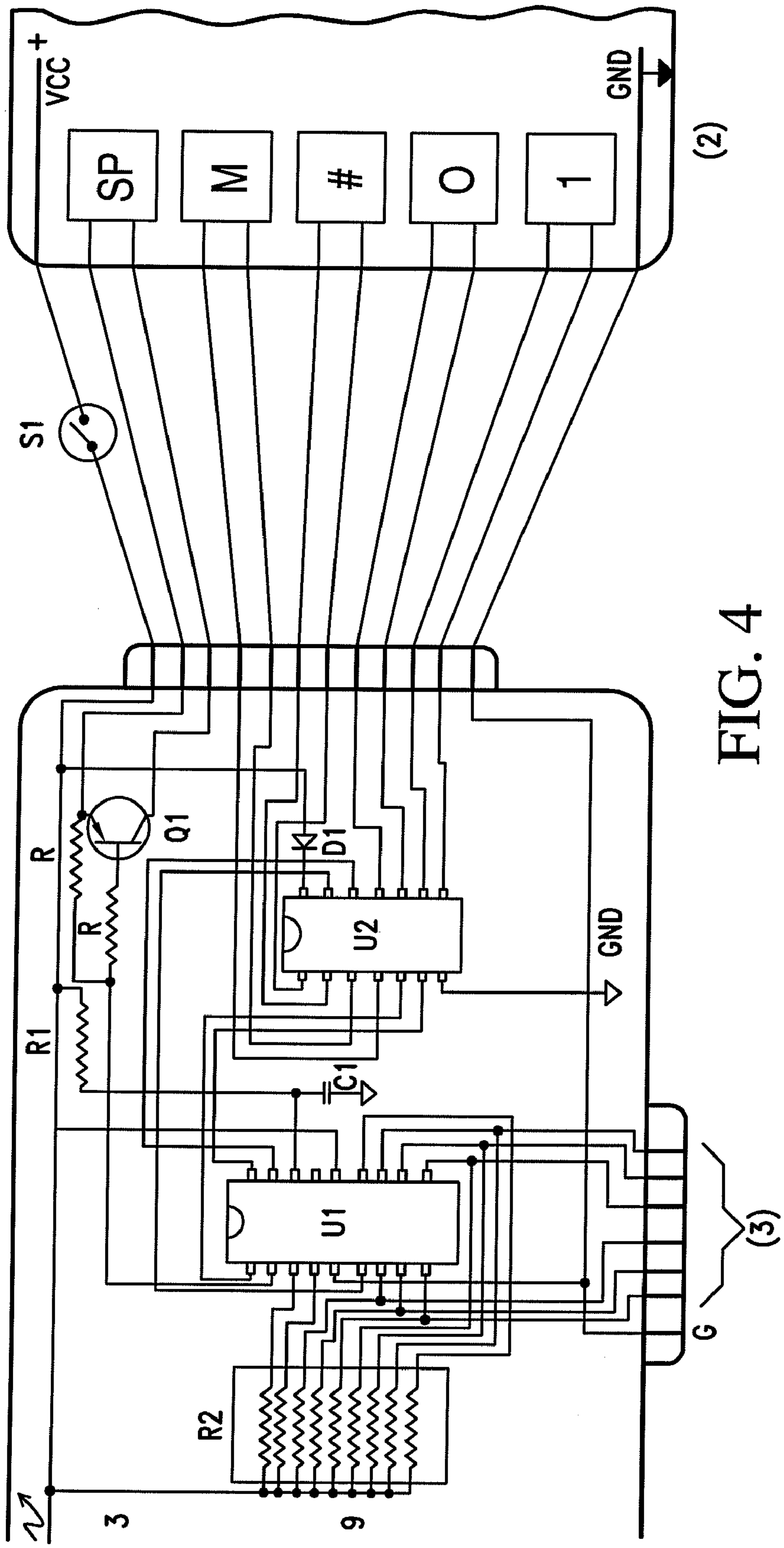
FIG. 4 is a schematic diagram of the electronic circuit used in the alarm system according to the present invention.

Referring to the drawings and initially to FIG. 1, it can be seen that an alarm system 1, according to the present invention, comprises a presently available telephone set 2, an electronic circuit 3 and a pager system 5. The electronic circuit 3 is connected to a plurality of sensors 4. The electronic circuit 3, in order to operate, uses DC voltage which is equal to the supply voltage of the telephone set 2. Also, it should be understood that for the purpose of describing the present invention, only six sensors are considered in use with the alarm system 1. Those skilled in the art will readily recognize that the number of sensors 4 may be varied according to the requirement of the user. The sensors, 10, 20, 30, 40, 50 and 60 form the inputs for the electronic circuit 3 of the alarm system 1. The inputs for the electronic circuit 1 are connected to the pull up resistors R, R1, R2 and R3 (as shown in FIG. 4). The inputs, along with ON/OFF switches, may also be connected to the electronic circuit 3.

The sensors 10, 20, 30, 40, 50 and 60 are adapted to sense different types of emergency events. For example, sensor 10 may be used to sense the opening and closing of the door, sensor 20 may be used to sense water leakage, sensor 30 may be used to sense gas leakage, so on and so forth.

Figure 2:
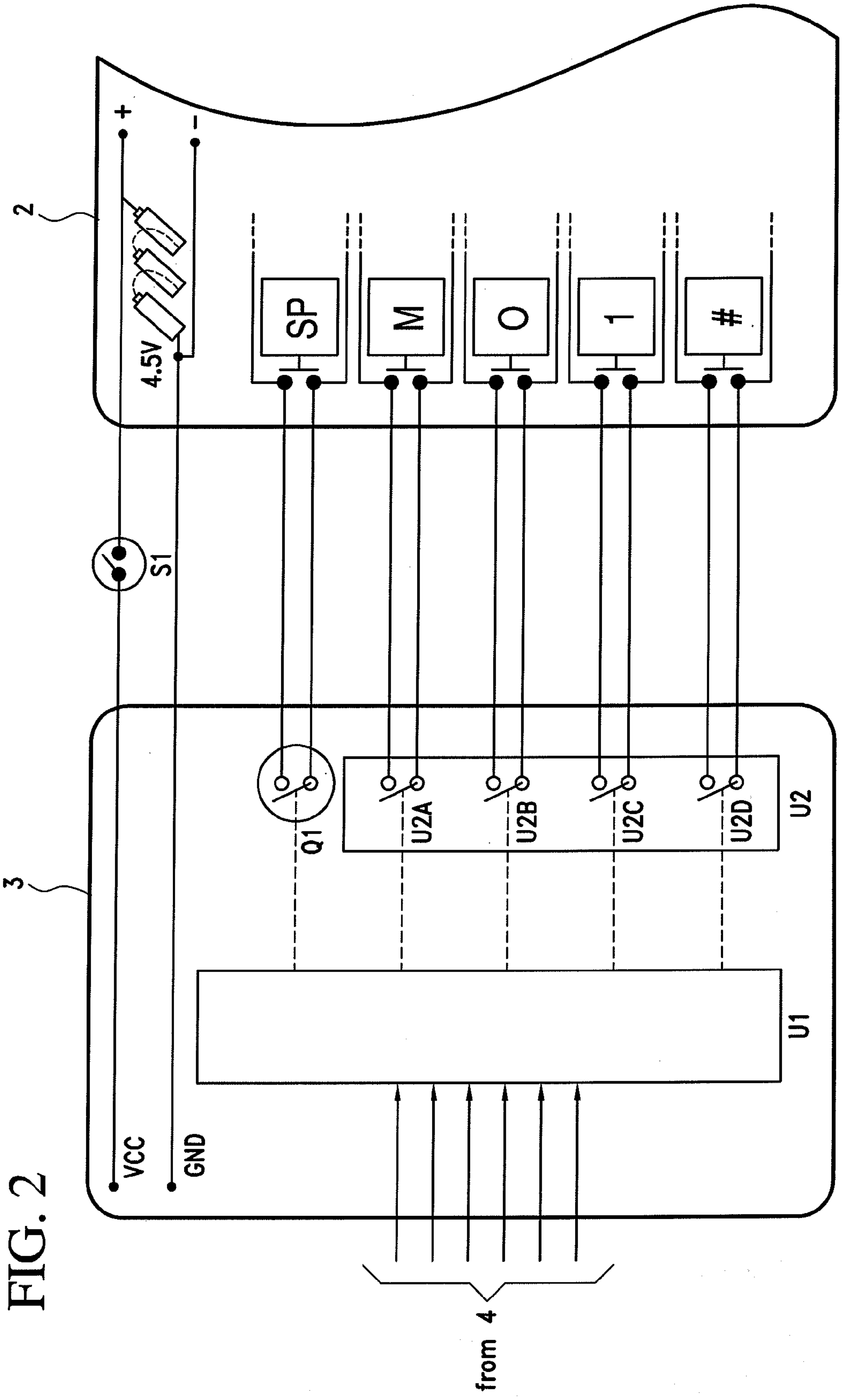
FIG. 2 shows an input and output of an electronic circuit used in the alarm system according to the present invention.

FIG. 2 shows a plurality of outputs, Q, U2A, U2B, U2C and U2D, of the electronic circuit 3 of the alarm system 1. The outputs, Q, U2A, U2B, U2C and U2D, of the electronic circuit 3 are connected in parallel with predetermined push buttons, SP, M, 0, 1, #, located on a keyboard of the telephone set 2 respectively. The pager number of the person to be contacted in case of emergency is stored in the memory of the telephone set 2. Upon closing of a contact of memory button M, the telephone set 2 automatically dials the stored pager number.

Figure 3:
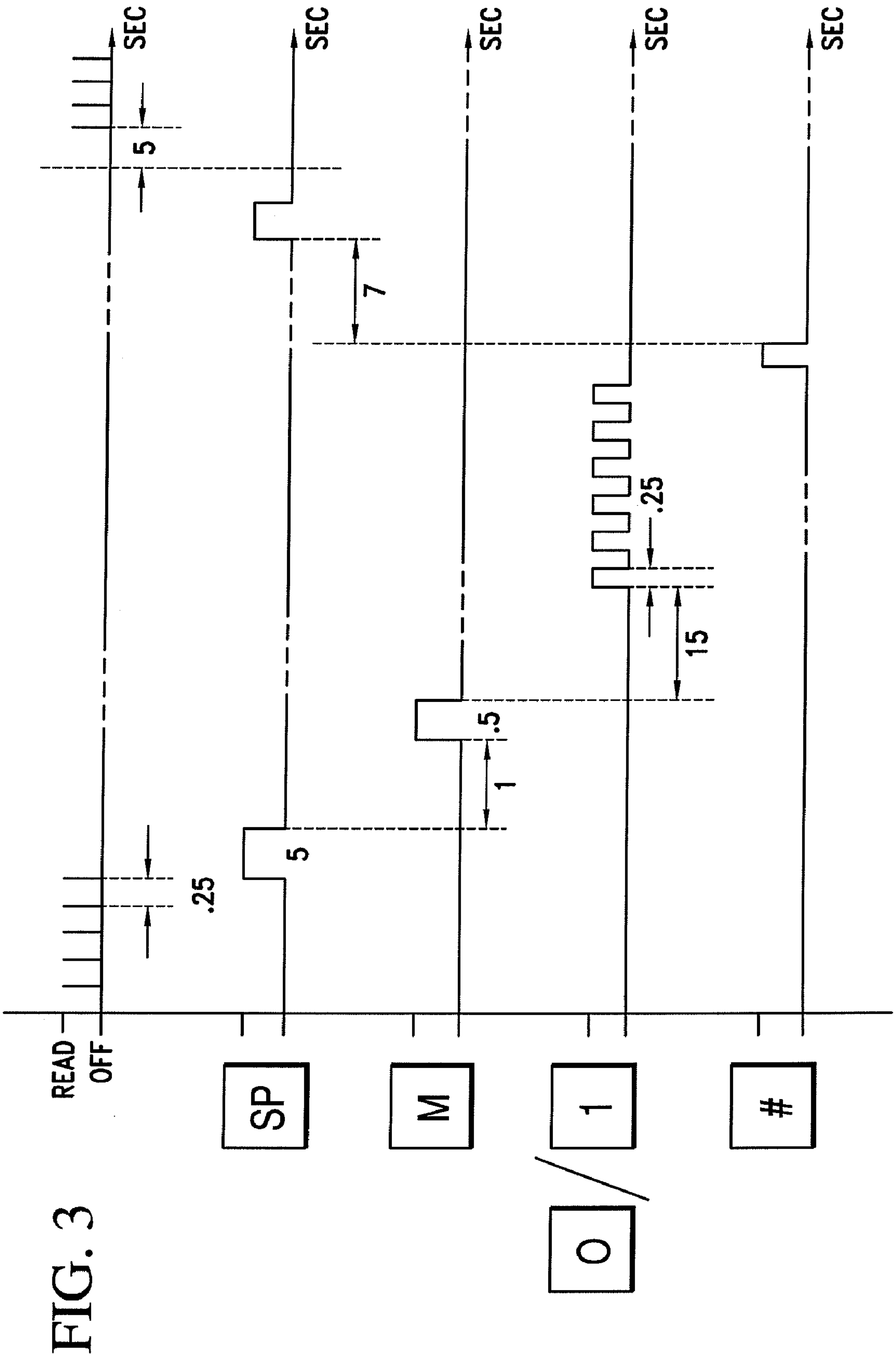
FIG. 3 shows a time sequence for each operation in the electronic circuit used in the alarm system according to the present invention.

In operation, for an initial setup of the alarm system 1, the alarm system 1 is switched ON, the electronic circuit 3 then reads an output state of each of the sensors 10, 20, 30, 40, 50 and 60 and registers the output state as a reference for normal condition. Thereon, the electronic system 1 reads the output of each of the sensors 10, 20, 30, 40, 50 and 60 for every 0.25 seconds. FIG. 3 shows the time sequence for each operation in the electronic circuit 3 used in the alarm system 1 according to the present invention.

The electronic circuit 3 of the alarm system 1, according to the present invention, is preprogrammed to detect any change, relative to the normal condition, in the output state of each of the sensors 10, 20, 30, 40, 50 and 60. For example, in case of emergency, if the sensor 30, which is used to sense gas leakage, changes its state from the normal condition, i.e. if there is a gas leakage, the alarm system 1 of the present invention closes the contacts of the button SP for 0.5 seconds in order to operate the telephone set 2. Thereafter, the contact of the button M is closed thereby automatically calling the pager number that has been stored in the memory of the telephone set 2. The electronic circuit 3 will then wait for fifteen seconds to receive a reply message from the pager system 5, then the electronic circuit 3 closes the buttons 1 or 0 for every 0.25 second such that every digit indicate the output state of each of the sensors 10, 20, 30, 40, 50 and 60 thereby generating the code as 110111. The code 110111 indicates the output state of each of the six sensors, wherein the digit 1 indicates that the corresponding sensor is in the normal condition and the digit 0 indicates that the corresponding sensor is not in the normal condition. The electronic system will then close the contact of button # thereby indicating the end of the code.

The electronic circuit 3 is programmed to wait for seven seconds after sending the code for confirming a sent message, the electronic circuit 3 closes the contact of the button SP thereby disconnecting communication between the telephone set 2 and the pager system 5. Thereafter, the electronic circuit 3 is programmed to wait for five seconds, and then again read the outputs of each of the sensors for every 0.25 seconds. The electronic circuit 3 of the alarm system 1 repeats the above mentioned steps in case of change in the output of any of the sensors 4.

Figure 5:
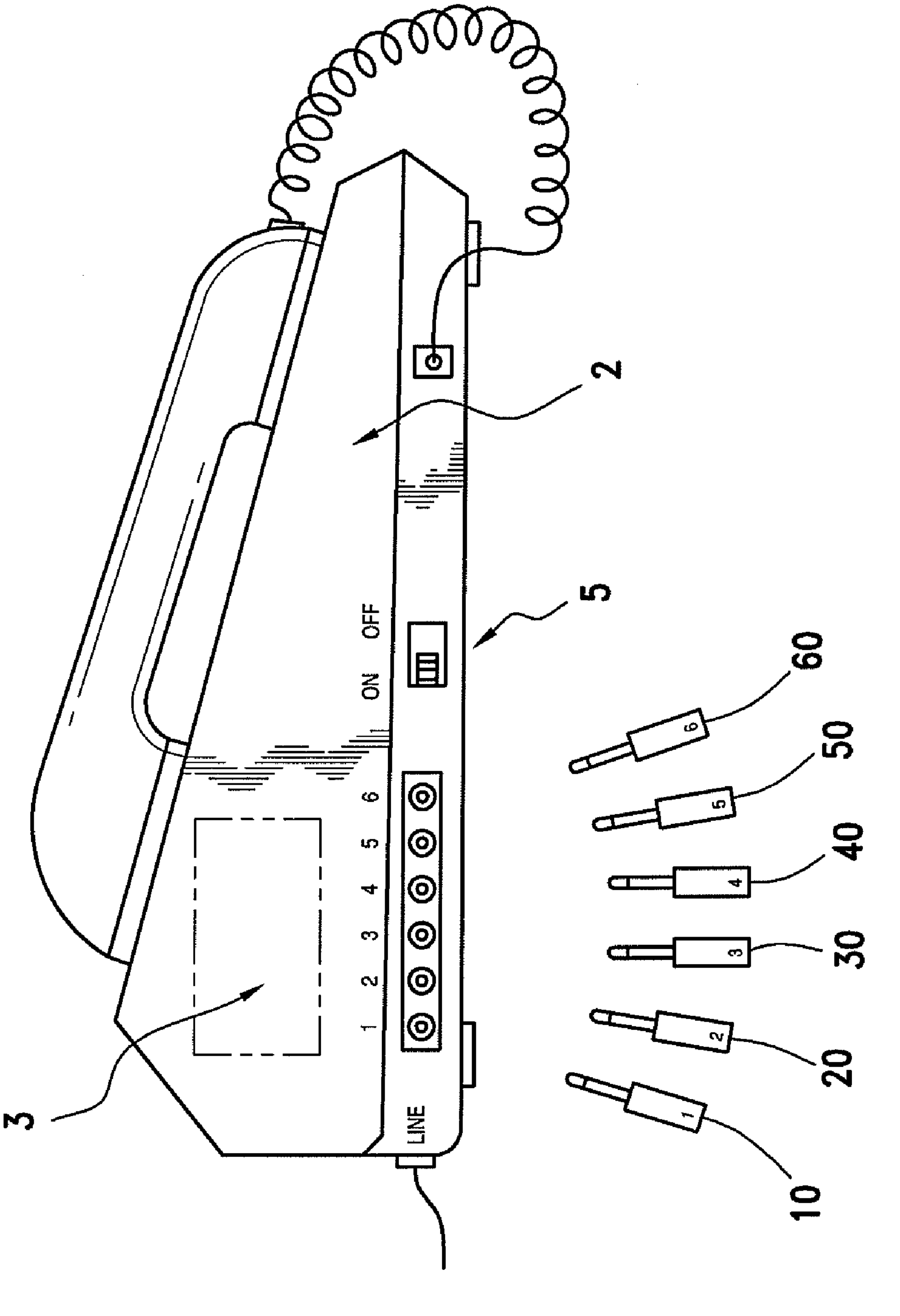
FIG. 5 shows a telephone set and the electronic circuit installed inside the telephone set of the alarm system according to the present invention.

FIG. 4 shows a schematic diagram of the electronic circuit 3 used in the alarm system 1 according to the present invention. R, R1, R2 and R3 represents the pull up resistors. The electronic circuit 3 of the alarm system 1 can also be installed inside the telephone set 2 as shown in FIG. 5.

What is claimed is:

1. An alarm system for use with a pager system, said alarm system comprising:

a preprogrammed electronic circuit;

a plurality of sensors;

a telephone set including a keypad and a selected button from said keypad of said telephone set connected in parallel to said preprogrammed electronic circuit;

means for triggering each of said plurality of sensors thereby causing the said electronic circuit to generate codes and automatically send a generated code from said telephone set to a recipient;

said pager system and said alarm system further comprises means for sending a code of at least six digits to said pager system thereby indicating a type of emergency;

the plurality of sensors including light beam, pressure, motion, temperature and smoke sensors, wherein said plurality of sensors are configured to sense a breaking of said light beam, pressure, motion, temperature and smoke;

wherein each of said plurality of sensors has a first or normal state and a second or alarm state;

wherein said alarm system is further configured to detect a change from said first or normal state to said alarm state of one of said plurality of sensors; and wherein said alarm system actuates a selectable key on said keypad in response to a change from a normal state to an alarm state.

* * * * *